United States Patent Office 3,456,454
Patented July 22, 1969

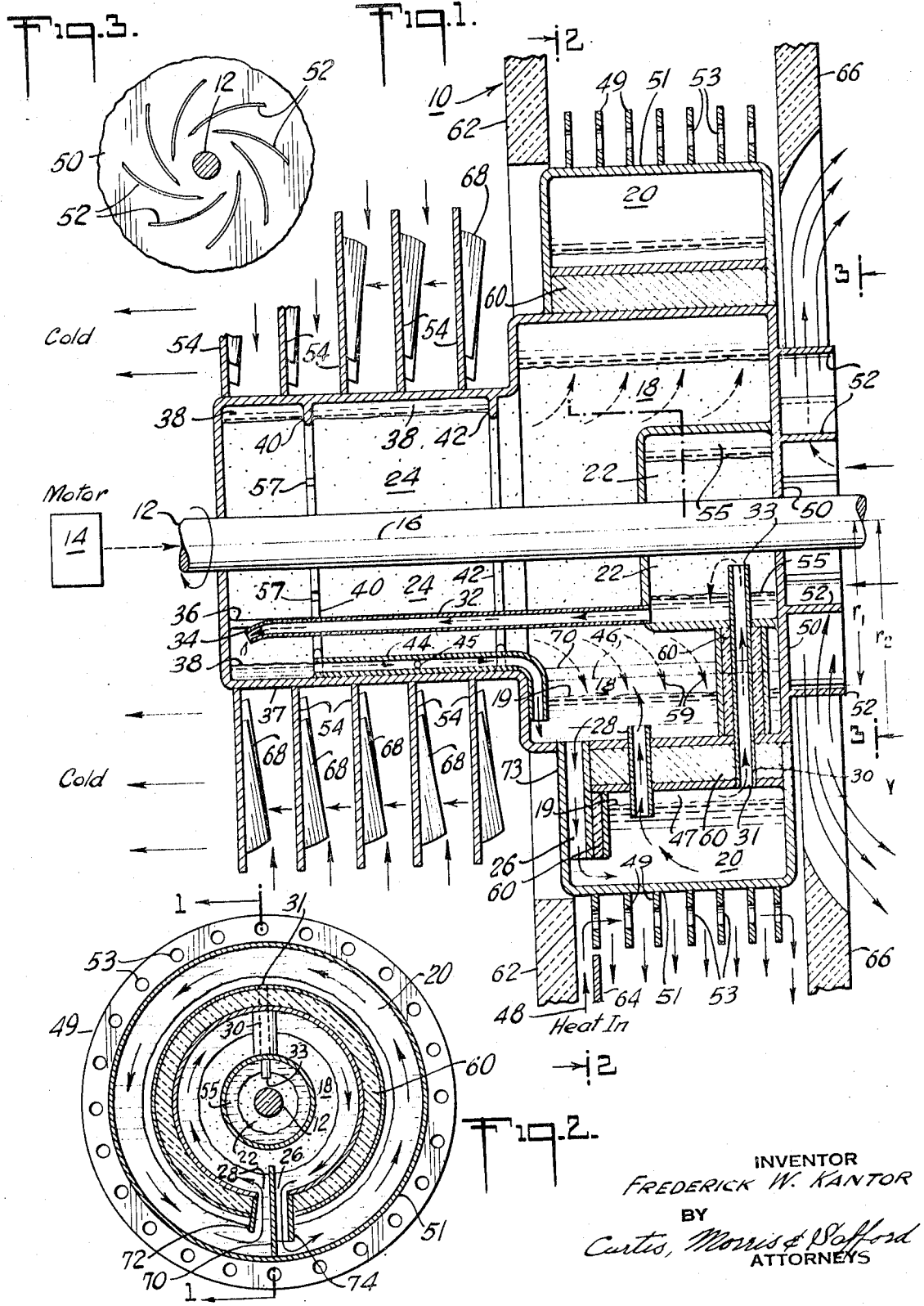

3,456,454
CENTRIFUGAL ABSORPTIVE THERMODYNAMIC APPARATUS AND METHOD
Frederick W. Kantor, 610 W. 114th St.,
New York, N.Y. 10025
Filed Jan. 10, 1967, Ser. No. 608,321
Int. Cl. F25b 15/04, 3/00
U.S. Cl. 62—101                                         10 Claims

ABSTRACT OF THE DISCLOSURE

Ammonia and water are rotated in a rotary enclosure. Ammonia gas is driven out of the water. Differential action of the centrifugal force on the liquid and the gas is used to compress the gas without use of a mechanical compressor. This differential action also is used to enhance circulation of the water in the rotor.

---

This invention relates to thermodynamic apparatus and methods utilizing centrifugal force for compression and movement of working fluids.

In my co-pending U.S. patent application Ser. No. 608,323, filed Jan. 10, 1967, there is disclosed a novel centrifugal refrigeration and heating apparatus and method in which gas and/or liquids are rotated in a sealed closed-loop conduit in a rotary enclosure. One object of the present invention is to provide a highly advantageous adaptation of the basic principles disclosed in my co-pending patent application to absorptive refrigeration and heating systems. Another object of the present invention is to provide such apparatus and methods which give good heat transfer and are highly efficient, with apparatus which is compact, simple, and has a minimum of moving parts. A further object is to provide such apparatus which is capable of operating in locations, such as in space, where there is no way to use a natural gravitational field to provide the necessary separation of gases and liquids.

The drawings and description that follow describe the invention and indicate some of the ways in which it can be used. In addition, some of the advantages provided by the invention will be pointed out.

In the drawings:

FIGURE 1 is a cross-sectional, partially schematic view of one embodiment of the present invention;

FIGURE 2 is a partially schematic cross-sectional view taken along the line 2—2 of FIGURE 1; and FIGURE 3 is a partially broken-away view taken along line 3—3 of FIGURE 1.

The device shown in FIGURE 1 includes a rotor indicated generally at 10 with a shaft 12 mounted in appropriate bearings (not shown) and rotated by a motor 14 about a rotational axis 16.

The rotor 10 includes an annularly-shaped liquid chamber 18 which contains a quantity of liquid 19 in which a refrigerant is absorbed. The liquid 19 flows from chamber 18 to an outer annular separation chamber 20 through a passageway 26 which exits near the outermost portion of chamber 20. Another conduit 28 whose outermost end is nearer than passageway 26 to the innermost wall of chamber 20, conducts the liquid from separation chamber 20 back into the liquid chamber 18.

A condensing chamber 22 is located near the axis 16 of the rotor 10. A conduit 30 interconnects the separator (generator) chamber 20 and the condensing chamber 22, with the inlet opening 31 of conduit 30 being located at the innermost wall of chamber 20. The innermost end 33 of conduit 30 is positioned in chamber 22 near the central axis 16.

An evaporation chamber 24 is positioned to the left of chambers 18, 22 and 24, and an elongated tube 32 with a restricted orifice 34 at its outermost end extends to a point adjacent the left wall of chamber 24. A member 36 is attached to the left end of tube 32 to hold the tube in place. Two separator ridges 40 and 42 are positioned on the inside surface of the outermost wall 37 of evaporator chamber 24 in order to collect and hold liquid emerging from the tube. Another tube 44 of small cross-section passes through the ridges 40 and 42 and downwardly into the liquid 19 in chamber 18. The tube 44 has a hole 45 to allow liquid to flow into it from between ridges 40 and 42.

The liquid and gas are sealed hermetically in the rotor 10. As a specific example, the absorbent liquid is water, and the refrigerant is ammonia. However, it should be understood that other known combinations of fluids used in absorption heating and refrigeration systems may be used in accordance with the principles of the present invention.

The operation of the device shown in FIGURE 1 is as follows: when the unit is at rest with the conduits 26 and 28 extending vertically downwardly as shown in FIGURE 1, the liquid 19 completely fills the chamber 20, the conduits 26 and 28, and fills the chamber 18 and the conduit 30 to the level indicated by the dashed line 46. Then, the rotor 10 is driven up to a constant rotating speed by the motor 14. Simultaneously, heat is added to the liquid in chamber 20 through fins 49 secured to the outer wall 51 of chamber 20, and heat is extracted from the fluids in chambers 18 and 22 through a common thermally-conductive wall 50 by means of fins 52. Heat also is extracted from the liquid refrigerant in evaporation chamber 24 by means of fins 54 secured to the outer wall 37 of chamber 24.

The addition of heat to the liquid in chamber 20 causes the heated liquid near the outermost wall 51 of chamber 20 to circulate in the chamber and move inwardly towards the conduit 28. Simultaneously, colder liquid which is denser than the liquid in chamber 20 moves outwardly from chamber 18 under centrifugal force and into chamber 20. The warmer and less dense liquid flows inwardly through conduit 28 to chamber 18. The liquid flowing downwardly through tube 26 is heavily laden with ammonia. During its travel through chamber 20, it loses much of its ammonia and it is heated and moves back up to chamber 18 where it is cooled and absorbs more ammonia and then moves through the same cycle again. This convective liquid flow is greatly enhanced by the action of centrifugal force on the two columns of water in the conduits 26 and 28. Since the liquid in column 26 has a greater density than that in conduit 28, the normal pressure differential causing the liquids to circulate is greatly augumented by centrifugal force. This enables the size of the device to be reduced very considerably.

Simultaneously with the convective circulation of liquids between chambers 18 and 20, the heating of the liquid in sepaartion chamber 20 causes the gas absorbed in the liquid to be sepaarted from the liquid. The ammonia gas, being of much lower density than the liquid, flows inwardly through tube 30 and into chamber 22 where it is cooled by heat transfer through the fins 52 and liquefies. The liquid flow from chamber 22 is restricted by the orifice 34 at the end of tube 32. This allows a quantity 55 of liquefied ammonia to accumulate in chamber 22, and permits the pressure of the gas in chamber 22 to increase to a high level. The heat of condensation of the gas is dissipated by means of the fins 52. The liquid 55 flows out of the chamber 22 through the orifice 34 under pressure at a controlled rate.

The liquid ammonia emerges from tube 32 and, if it does not evaporate immediately, collects in annularly-shaped pools 38 between the ribs 40 and 42. The rib 40 may have notches 57 in it to permit liquid to flow past the rib 40 and into the space between ribs 40 and 42. The fins 54 conduct heat to the liquid 38 contacting the outer wall 37 of chamber 24, and thus evaporate the liquid. The gaseous ammonia then moves to the right and towards the surface of the water 19 in chamber 18, as indicated by the dashed arrows 59, where it again is absorbed.

As is well known, the temperature of the water should be maintained at a low level in order to keep its ammonia absorption rate high. The temperature of the liquid 19 is kept low by means of the cooling fins 52, and by contact with the cool ammonia. The amount of each type of cooling can be varied in accordance with the requirements of a given system.

The purpose of the drain tube 44 is to drain back into the chamber 18 any water which may have splashed into the evaporating chamber 24 when the rotor was at a standstill. When the rotor 10 is rotated at a suitable speed, liquid ammonia will fill the tube 44. However, the lower end of the tube 44 is submerged in water to a depth which is such as to prevent further flow of the liquid ammonia into the water. Since the water has a greater density than the ammonia, the pressure of the water on the end of tube 44 will balance that of the ammonia and prevent the flow of the ammonia into chamber 18. The end of the tube 44 in the water tank is of sufficiently small cross section to reduce to negligible proportions the diffusion of ammonia-laden water into the tank 18 so that this duct 44 does not constitute an appreciable continuing drain for ammonia by either flow or diffusion.

Thermal insulation 60 is provided between the chambers 18 and 20, between the liquid in chamber 20 and the wall of conduit 26, and around the portion of conduit 30 which passes through chamber 18. This insulation protects against undesired thermal transfer between the conduits so insulated from one another. Similarly, insulation may be provided at other places in the device to prevent undesired heat transfer.

The addition of heat in separation chamber 20 preferably is accomplished by forcing hot air in the direction indicated by the arrow 48 between a pair of annular stationary baffle members shown at 62 and 64. The baffle member 62 preferably is made of thermal insulating material so as to minimize heat transfer to the fins 54. Each of the radial fins 49 has a plurality of peripherally-spaced holes 53 (see FIGURE 2). The heated air flows inwardly between guides 62 and 64, passes from one fin to the next through holes 53, and then flows outwardly after it has exchanged its heat with the fins. Another annular baffle 66 at the right edge of chamber 20 guides the warm air outwardly from the fins 49 and prevents interference with the air thrown off by fins 52.

As is best shown in FIGURE 3, fins 52 are shaped spirally so as to pump air through them rapidly and enhance heat transfer. Of course, the fins can have any other shape desired. Also, as is well known, heat transfer can be further enhanced by using liquids instead of gases as the cooling medium.

Each of the fins 54 has a plurality of punched-out sections 68 which form fan blades. These fan blades draw in ambient air to be cooled, cool the air, and blow the air to the left where it may be used for refrigeration as desired. It should be understood that the device may be used advantageously for heating as well as refrigeratioin simply by using the heat given off by fins 52 for heating purposes.

The liquid return conduit 28 is shown in FIGURE 1 in a diagrammatic form for the purpose of clarifying the explanation of the operation of the invention. The actual preferred construction is shown in FIGURE 2. A radial separator plate 70 extends axially across the entire width of each of the chambers 18 and 20 and extends inwardly to the maximum innermost liquid level which is expected to be attained when the device is operating. The conduit 28 actually is directly behind conduit 26 in FIGURE 1, and is formed by a wall member 72 projecting outwardly from the radial wall 73 (see FIGURE 1) to form a conduit on the other side of partition 70 from the conduit 26. The conduit 26 similarly is formed by another wall 74 projecting from the wall 73.

In accordance with the present invention, the flow through the two conduits 26 and 28 is separated by as great a circumferential distance as possible. This is done in order to maximize the distance over which the cold liquid from chamber 18 travels in the chamber 20 and thus maximize the amount of heat transfer into the liquid. Similarly, the separator 70 separates the flows in the two conduits so that the heated liquid passing upwardly through the conduit 38 must travel completely around the circumference of annular chamber 18 in order to reach conduit 26. This advantageously maximizes the heat transfer of heat out of the liquid through fins 52, and maximizes the time of contact between the liquid and the gas coming from chamber 24 so as to maximize the absorbtion of gas into the liquid.

The location of the conduit 30 for conducting gas into chamber 22 is not particularly critical. However, it is shown in FIGURE 2 spaced approximately 180° away from the location of partition 70. This location is not shown correctly in FIGURE 1, again for the reason that the schematic illustration given in FIGURE 1 clarifies the operation of the invention. It should be understood, of course, that weights should be added to balance the structure if any unbalance occurs due to asymmetrical location of the flow passages.

One of the major advantages of the present invention is that the gaseous ammonia in chamber 22 is very efficiently compressed to a relatively high pressure without the use of a mechanical compressor. This compression is produced by the action of centrifugal force upon the liquid in chamber 18 and conduit 26 and the gas in conduit 30. Since the density of the liquid is vastly greater than that of the gas, the gas must become greatly compressed before it can exert a pressure on the surface of the liquid in chamber 20 sufficient to balance the great pressure produced by the action of centrifugal force on the liquid in chamber 18 and conduit 26. The pressure to which the gas is compressed is given approximately by the following equation:

$$[1] \qquad P = \omega^2 (\Delta r)^2 \rho K$$

In which:

P is the gas pressure, in p.s.i.g.
$\omega$ is the rotational speed of the rotor, in radians per second
$\Delta r$ equals $r_2 - r_1$ (see FIGURE 1), the difference between the radii of the liquid levels in chambers 18 and 20, in inches
$\rho$ is the density of the liquid in pounds per cubic inch.
K is a rationalization constant equal to $1/768$ for the units of measure specified above.

In the foregoing equation, the assumption has been made that the density of the gas is very much lower than that of the liquid and therefore can be ignored.

Because of the very high pressures which may be obtained in the gaseous ammonia, the temperature at which condensation occurs in chamber 22 is greatly increased and the temperature differential between the chamber 22 and the ambient is correspondingly increased. This creates more rapid transfer of heat from chamber 22. This makes it possible to further reduce the size of the device. Also, the higher temperature in chamber 22 makes it possible for the system to operate in a higher temperature ambient medium than otherwise would be possible.

As was mentioned above, further size reductions are made possible because the convective water flow is greatly augmented by centrifugal force. Also, the heat transfer surfaces are in contact with liquids, thus greatly increasing the rate of heat flow and permitting a high heat pumping capacity in a relatively small device. Thus, the unit may be made so small that it can be carried as a part of an astronaut's space suit or can be used as part of a biological package with an integral cooling system.

Another important advantage is that the device of this invention provides its own substitute for a gravitational field, and yet requires no outside pumping unit. Thus, it can be used where there is no way to use a gravitational field; for example, in space, or in vehicles in which the alignment of the system with respect to the gravitational field is not constant.

The above description of the invention is intended to be illustrative and not limiting. Various changes or modifications in the embodiments described may occur to those skilled in the art and these can be made without departing from the spirit or scope of the invention as set forth in the claims. For example, among the variations well known in the art are the use of a non-absorbed buffer gas in the region with low (partial) pressure of the refrigerant; and the use of various heat exchange systems to permit the use of what is known as "regenerative" cooling.

I claim:

1. Absorptive heating and refrigerating apparatus, said apparatus comprising, in combination, a rotor, means for rotating said rotor, first conduit means extending between first and second radial positions with respect to the rotational axis of said rotor for conveying between said positions a first fluid absorbed in a second fluid, means for separating said first fluid in gaseous form from said second fluid, second conduit means extending towards said axis to a third radial position for conveying said gas towards said axis under pressure, means for liquefying said gas at said third position, and third conduit means for conveying said liquefied gas to a fourth radial position, means for adding heat to said liquefied gas at said fourth position and evaporating it, and fourth conduit means for conveying the evaporation product back to said first position.

2. Apparatus as in claim 1 including a chamber at said fourth position having outermost wall means extending in the direction of said axis utilizing centrifugal force for holding said liquefied gas against said wall, and heat transfer means contacting said wall.

3. Apparatus as in claim 1 including an annular chamber at each of said first and second positions, said conduit means extending therebetween including two conduits separated from one another circumferentially so as to maximize the circumferential flow of liquids in each of said chambers before flowing into the other chamber.

4. Apparatus as in claim 3 in which one of said chambers surrounds the other, and a separator member extending radially from the outermost wall of the outermost chamber to a position inward from the normal innermost rotational water level in the innermost chamber, with one of said two conduits on one side of said separator member and the other conduit on the other side.

5. Thermodynamic apparatus comprising, in combination, a rotor, means for rotating said rotor about an axis, first, second and third chambers carried by said rotor at corresponding first, second and third radial distances from said axis, said second distance being greater than said first and third distances, first conduit means interconnecting said first and second chambers for directing the convective flow of liquids therebetween, second conduit means interconnecting said second and third chambers for directing the flow of gas therebetween, restricted conduit means interconnecting said third and first chambers for directing and restricting the flow of liquids therebetween, and means for conducting heat into said second chamber and out of said first and third chambers.

6. Apparatus as in claim 5 including a liquid in said first and second chambers, and a gas in said chambers, said gas being easily absorbed by said liquid.

7. Apparatus as in claim 6 in which said gas is ammonia and said liquid is water.

8. Absorptive heating and refrigerating apparatus, said apparatus comprising, in combination, a rotor, an annular water chamber in said rotor, an annular separator chamber surrounding said water chamber, a first conduit leading from said water chamber into the outermost part of said reparation chamber, a second conduit leading from said water chamber to a position radially outwardly from the innermost portion of said separation chamber, said conduits being separated from one another circumferentially by a separator member extending radially into said water chamber to a position located radially inwardly from the normal innermost rotational water level in said water chamber and across the full axial width of each of said chambers to block circumferential flow past it in both chambers, an annular condenser chamber located radially inwardly from said water chamber, a third conduit extending from the innermost portion of said separation chamber to said condenser chamber, an evaporation chamber extending axially from said condensation chamber, a fourth conduit extending axially from the outermost portion of said condenser chamber to near the axially most distant portion of said evaporation chamber, said fourth conduit having a restriction near its farthest end, axially-spaced ridges on the inner surface of the outer wall of said evaporation chamber to hold liquid against axially-drected flow, a fifth conduit extending axially through said ridges and into said water chamber, said water and condenser chambers having a common radial wall with heat-dissipating fins extending therefrom in a spiral pattern, radial fins with plural peripherally-spaced holes extending from the outermost wall of said separation chamber, and fan shaped fins extending from the outermost wall of said evaporation chamber.

9. A thermodynamic process, said process comprising the steps of rotating a gas and a gas-absorbing liquid in a rotary enclosure, guiding the flow of said liquid from a first station to a second station which is at a radial distance from the axis of rotation of said rotary enclosure which is greater than the corresponding radial distance of said first station, guiding said liquid back to said first station, driving a quantity of said gas out of said liquid at said second station and guiding said gas from said second station to a third station at a radial distance less than said radial distance of said second station, liquefying said gas at said third station and guiding the flow of the liquefied gas back to said first station under restriction, evaporating the last-named liquid to re-form said gas at said first station and causing said gas to be absorbed into said first-named liquid.

10. An absorption refrigeration and heating process comprising the steps of absorbing a refrigerant in an absorbent fluid of substantially greater density than said refrigerant, applying centrifugal compressive forces to the resultant fluid, heating the latter to drive the refrigerant out in gaseous form, applying centrifugal compressive forces to the gaseous refrigerant, the latter forces opposing those on said resultant fluid, restricting the flow of said gaseous refrigerant while cooling it to liquefy it, adding heat to the liquefied refrigerant to evaporate it, and absorbing the resulting gas in said absorbent fluid.

References Cited

UNITED STATES PATENTS

| 1,315,282 | 9/1919 | Carpenter | 62—499 X |
| 2,197,001 | 4/1940 | Maiuri | 62—499 X |
| 2,724,953 | 11/1955 | Justice | 62—499 X |

ROBERT A. O'LEARY, Primary Examiner

ALBERT W. DAVIS, JR., Assistant Examiner

U.S. Cl. X.R.

62—476, 499